UNITED STATES PATENT OFFICE.

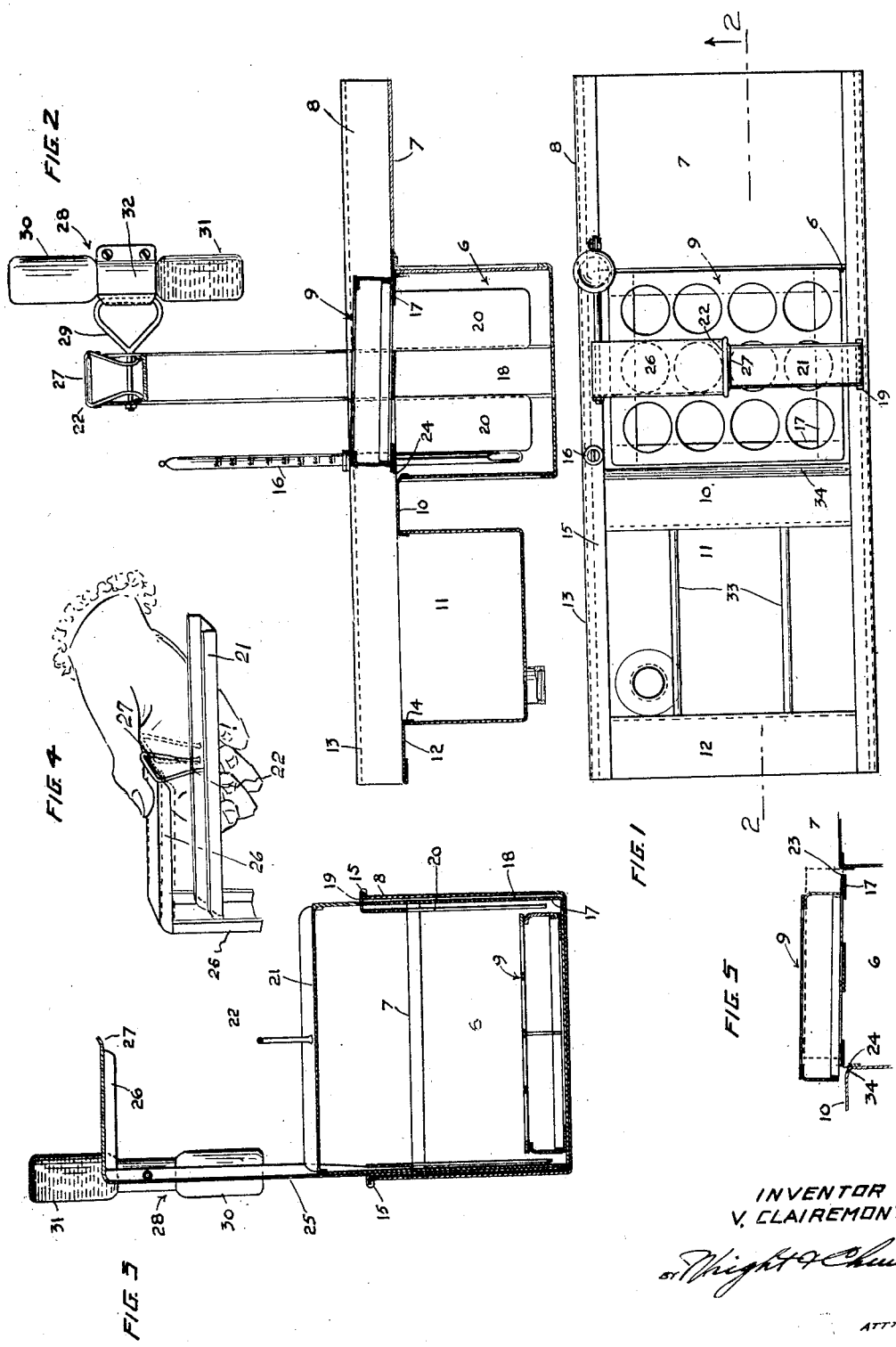

VICTOR CLAIREMONT, OF SAN FRANCISCO, CALIFORNIA.

EGG-PRESERVING APPARATUS.

1,370,630.  Specification of Letters Patent.  Patented Mar. 8, 1921.

Application filed July 13, 1920. Serial No. 395,885.

*To all whom it may concern:*

Be it known that I, VICTOR CLAIREMONT, a citizen of the United States, residing at San Francisco, in the county of San Francisco and State of California, have invented new and useful Improvements in Egg-Preserving Apparatus, of which the following is a specification.

This invention relates to new and useful improvements in apparatus for dipping or immersing eggs in a preserving solution and is of a type similar to the apparatus disclosed in my U. S. Letters Patent No. 1,224,711, issued May 15, 1917, and in my pending application for Letters Patent of the United States filed March 10, 1920, Ser. No. 364,799.

The primary object of this invention is to provide egg preserving apparatus of the character described which will be especially adapted for household or individual use by the farmer or small dealer because of its simplicity, relatively small size and cheapness as to cost and operation, the apparatus being of such nature that it may be readily placed upon a gas stove or coal range and operated by hand with comparative ease to preserve large quantities of eggs in a relatively short time.

An object of the invention is to provide means of novel construction for releasably supporting the dipping basket out of dipping position, said means being easy to operate and reliable in use.

The invention possesses other advantages and features some of which, with the foregoing will be set forth at length in the following description wherein I shall outline in full that form of the invention which I have selected for illustration in the drawings accompanying and forming a part of the present specification. In said drawings, I have shown one form of the construction of my invention, but it is to be understood that I do not limit myself to such form, since the invention as expressed in the claims may be embodied in a plurality of forms.

Referring to the drawings:

Figure 1 is a top plan view of the apparatus of the invention.

Fig. 2 is a longitudinal vertical sectional view taken on line 2—2 of Fig. 1.

Fig. 3 is a transverse sectional view of the apparatus, showing the basket in dipping position.

Fig. 4 is a fragmentary perspective view of the means for releasably holding the basket in up position showing it in releasing position in dotted lines.

Fig. 5 is a fragmentary sectional view of the tank and basket, showing an egg tray on the basket and the relation arrangement of the basket, and tank, to facilitate positioning and removal of the egg tray relative to the basket.

In the present embodiment of this invention, there is provided a preferably rectilinear tank or receptacle 6 open at its upper end and which is adapted to contain a preserving liquid, not shown. From the upper edge of this tank on one side thereof, an egg tray support 7 extends substantially horizontally. This support is preferably in the form of a plate of sheet metal and has side walls 8 between which walls an egg tray such as the one 9 is moved so as to be directed over the tank. A flat plate 10 corresponding to the support 7 extends from the opposite upper edge of the tank and is joined to the upper edge of a receptacle 11 which may be used for egg candling purposes. A member 12 is secured to and extends from the opposite edge of the receptacle 11 so as to act as a support for the egg tray. The members 10 and 12 have side walls 13 which are integral with the side walls 8. Thus the members 7, 10 and 12 are preferably formed integral, lie in the same plane and are secured to the tank and receptacle at certain of their transverse edges by bending down said edges over the upper edges of the tank and receptacle as at 14. These elements constitute the body of the apparatus and said body is of such size that it may be readily placed upon an ordinary kitchen stove or gas range so as to heat the preserving liquid in the tank. By forming the body of sheet metal, it is made comparatively light and can be easily handled. The upper edges of the side walls are provided with lateral flanges 15.

As a means for determining the temperature of the preserving liquid a thermometer 16 is inserted into the tank 6 and supported in the flange 15 so as to extend well above the body of the apparatus and be at all times visible to the operator.

I provide means for lowering the egg tray 9 into the tank so as to immerse eggs (not shown) supported by the tray. This means comprises a vertically movable basket 17 of skeleton construction and which is of such size that it may be readily lowered into said tank. Extending upwardly from opposite sides of the body of the basket 17 are arms 18 which are slidably extended through openings 19 formed in the flanges 15. Depending from upper edges of the side walls 8 are guide plates 20; these plates 20 are disposed on opposite sides of the basket and are engaged by said basket in the up and down movement thereof. The arms 18 are connected at their upper ends by a horizontal handle portion 21 formed preferably of some resilient sheet metal. The handle portion 21 has a transverse keeper member 22 thereon.

To facilitate the moving of the tray 9 onto the basket 17 so as to provide for speed and accuracy of such movement, the basket is inclined downwardly so that the edge 23 thereof opposed to the supporting member 7 is disposed below the upper surface and said member 7. This provides shoulders 24 at the juncture of said member 7 with upper edges of the adjacent wall of the tank 6. Thus in sliding the tray 9 from the supporting member 7 onto the basket 17, the possibility of the tray encountering the basket and being obstructed thereby is avoided. The opposite edge of the basket which provides the shoulder 24, is disposed above the supporting surface 10. This will facilitate sliding of the tray 9 off of the basket 17 and on to said surface 10 as shown particularly in Fig. 5. As the operator slides the tray onto the basket supporting member 7 and should he move the tray past the proper point on said tray to the position shown in full lines in Fig. 5, by moving said tray back toward the supporting member 7 it is caused to encounter the shoulder 24 and is stopped in proper position to be lowered with the basket into the tank. Extending upwardly from one side of the tank 6 is a vertical standard 25 provided at its upper end with a laterally extending projection 26. These parts 25 and 26 are formed of resilient sheet metal preferably. The outer end of the projection 26 is provided with an upturned lip 27 adapted to support the keeper 22 so as to hold the basket 17 in the normal position shown in Figs. 2 and 5.

A timing device 28 is mounted upon the standard 25 upon a vertical shaft 29 journaled horizontally in said standard. The timing device consists of two receptacles 30 and 31 having a communicating passage 32. A suitable liquid is placed in one of the receptacles and the communicating passage 32 is of such size that a predetermined time is required for the liquid to pass from one receptacle to the other. This is facilitated by turning of the device so that the receptacle containing the liquid is disposed uppermost. Preferably this timing device is arranged to empty the contents of one receptacle into the other from five to seven seconds, this being the time generally required to keep eggs immersed in a preserving solution heated to a temperature of substantially 240° F., or primarily to a temperature above the boiling point of water in order to preserve the eggs.

In the operation of the apparatus, assuming that the basket 17 is in down position as shown in Fig. 3 to dispose said basket in position to receive and support the egg tray 9, the basket is lifted upwardly so that the keeper 22 is brought opposite the upturned lip 27. It will be noted that the keeper is normally disposed rearward of the forward edge of the lip but by reason of the fact that the standard 25, extension 26, arms 18, and handle member 21 are resilient, by grasping the extension 26 of the handle member after the manner shown in Fig. 4 and applying a twisting pressure thereon the keeper is brought outward of and then extended over said lip. This action is particularly shown in Fig. 4 of the drawing. With the basket thus disposed in normal position, the operator moves the tray 9 containing the eggs (not shown) from the supporting member 7 onto the tray 17. This may be quickly accomplished by reason of the fact that the lower edge 23 of the tray opposite to the member 7 lies below the level of said member 7. Should the operator move the tray too far to the left, as shown in full lines in Fig. 5 he may by a reverse movement quickly move the tray so that it will contact with the shoulder 23 and thus be in proper position to be lowered into the tank. The operator then releases the keeper member 22 by applying a twisting pressure upon the extension 26 and handle 21 as shown in Fig. 4. The basket and tray are then lowered into the tank so as to immerse the eggs in the liquid therein. As soon as this is done the operator quickly turns the timing device so that the receptacle containing the liquid is uppermost. By now watching the timing device, immediately when the liquid has run from one receptacle to the other the handle 21 is grasped and the basket 17 is lifted upwardly so as to lift the eggs out of the liquid. Then with a quick movement of the hand as hereinbefore explained, the keeper member is hooked over the lip 27 and the basket is supported in up position as shown in Figs. 2, 3 and 5. The tray 9 is then moved off of the basket on to the supporting surface 10 and is moved over the candling receptacle 11. The candling receptacle is provided with two supporting members 33 for supporting said tray. The eggs are then candled and moved off of said supporting members 33 and 12 to be further handled. Another tray is then moved on to the basket 17 and the operation hereinbefore described repeated. This operation may be carried on continuously so that a large quantity of eggs may be treated with ease and facility in a comparatively short time.

To further facilitate the proper positioning of the tray 9 on the basket 17 the edge of the member 10 where joined to the upper edge of the tank 6 is beveled downwardly and inwardly as at 34. When the tray is disposed so as to slightly overhang the shoulder 24 of the basket 17 the overhanging portion will contact with the beveled portion 34 and be guided downwardly and inwardly so as to automatically dispose the tray in proper position upon the basket and permit the basket and tray to be lowered into the tank.

I claim:—

1. Egg preserving apparatus embodying in its construction a tank containing a preserving liquid, a basket arranged to be moved into and out of the tank, a handle carried by the basket, a keeper member on said handle, and a member disposed above the tank upon which the keeper member is arranged to engage and support said basket in up position.

2. Egg preserving apparatus embodying in its construction a tank adapted to contain a preserving solution, a basket for supporting eggs to be treated movable into and out of said tank and manually operable means for releasably supporting the basket in up position out of said tank.

3. Egg preserving apparatus embodying in its construction a tank containing a preserving solution, a basket for supporting eggs to be treated arranged to be moved into and out of said tank, a handle on said basket, a member disposed above said handle, and means carried by said handle arranged to coöperate with said last-named member so as to support said basket in up position.

4. Egg preserving apparatus embodying in its construction a tank containing a preserving solution, a basket for supporting eggs to be treated arranged to be moved into and out of said tank, a resilient handle on said basket, a resilient member disposed above said handle and a member carried by said handle and arranged to operatively engage with and to be disengaged from said resilient member by flexing of said handle and resilient member, whereby the basket may be held in up position relative to the tank and released from said position so as to be lowered into the tank.

5. Egg preserving apparatus embodying in its construction a tank to contain preserving solution, a basket for supporting eggs to be treated movable into and out of said tank, means for supporting the basket in position out of the liquid in said tank, said basket having one side thereof disposed below the level of the adjacent upper edge of the tank and its other side disposed above the adjacent upper edge of the tank.

6. Egg preserving apparatus embodying in its construction, a tank for containing a preserving solution, a basket for supporting eggs to be treated arranged to be moved into and out of the liquid in said tank, and means for normally supporting said basket above the liquid in the tank with one side of said basket disposed below the upper edge of the tank opposite thereto and the other side of the basket disposed above the opposite corresponding edge of said tank.

7. Egg preserving apparatus embodying in its construction a tank to contain a preserving solution, egg tray supporting surfaces extending outwardly from said tank, a basket for supporting eggs to be treated arranged to be moved into and out of said tank, and means for normally supporting said basket in position with one side thereof disposed below one of said egg tray supporting surfaces and the other side thereof disposed above the other egg tray supporting surface.

VICTOR CLAIREMONT.